United States Patent
Wallis

[11] Patent Number: 5,816,658
[45] Date of Patent: Oct. 6, 1998

[54] HEAD REST LOCK

[75] Inventor: David E. Wallis, Dubuque, Iowa

[73] Assignee: Flexsteel Industries, Inc., Dubuque, Iowa

[21] Appl. No.: 862,477

[22] Filed: May 23, 1997

[51] Int. Cl.⁶ .................................................. A47C 1/10
[52] U.S. Cl. .......................................... 297/410; 297/391
[58] Field of Search ..................... 297/410, 391

[56] References Cited

U.S. PATENT DOCUMENTS

| | | | |
|---|---|---|---|
| 4,193,631 | 3/1980 | Hobley et al. .......................... | 297/408 |
| 4,411,470 | 10/1983 | Nishimura et al. .................... | 297/410 |
| 4,427,233 | 1/1984 | Matumoto ............................... | 297/391 |
| 4,478,456 | 10/1984 | Mitsui ..................................... | 297/410 |
| 4,527,834 | 7/1985 | Zyngier ................................... | 297/410 |
| 4,568,123 | 2/1986 | Yasui et al. ............................. | 297/410 |
| 4,679,850 | 7/1987 | Bianchi et al. ......................... | 297/410 |
| 4,685,737 | 8/1987 | Deley et al. ............................ | 297/408 |
| 4,798,415 | 1/1989 | Tanino et al. ........................... | 297/410 |
| 4,854,642 | 8/1989 | Vidwans et al. ..................... | 297/391 X |
| 4,976,493 | 12/1990 | Frankila ................................. | 297/410 |
| 4,978,169 | 12/1990 | Shannon et al. ....................... | 297/410 |
| 5,080,437 | 1/1992 | Pesta et al. ............................. | 297/410 |
| 5,529,379 | 6/1996 | Stocker ................................... | 297/410 |

*Primary Examiner*—Milton Nelson, Jr.
*Attorney, Agent, or Firm*—Lee, Mann, Smith, McWilliams, Sweeney & Ohlson

[57] ABSTRACT

A head rest lock enables the adjusting of the elevational position of a head rest of a vehicle seat having sleeves that serve as vertical guides for support posts having lock notches therein, the notches providing a plurality of vertical height adjustment positions. The sleeves include a lock latch for manually activating the adjustable height mechanism and ribs which prevent inadvertent rotation of said sleeve. The head rest lock is mountable to a bracket or directly to a seat back frame.

8 Claims, 4 Drawing Sheets

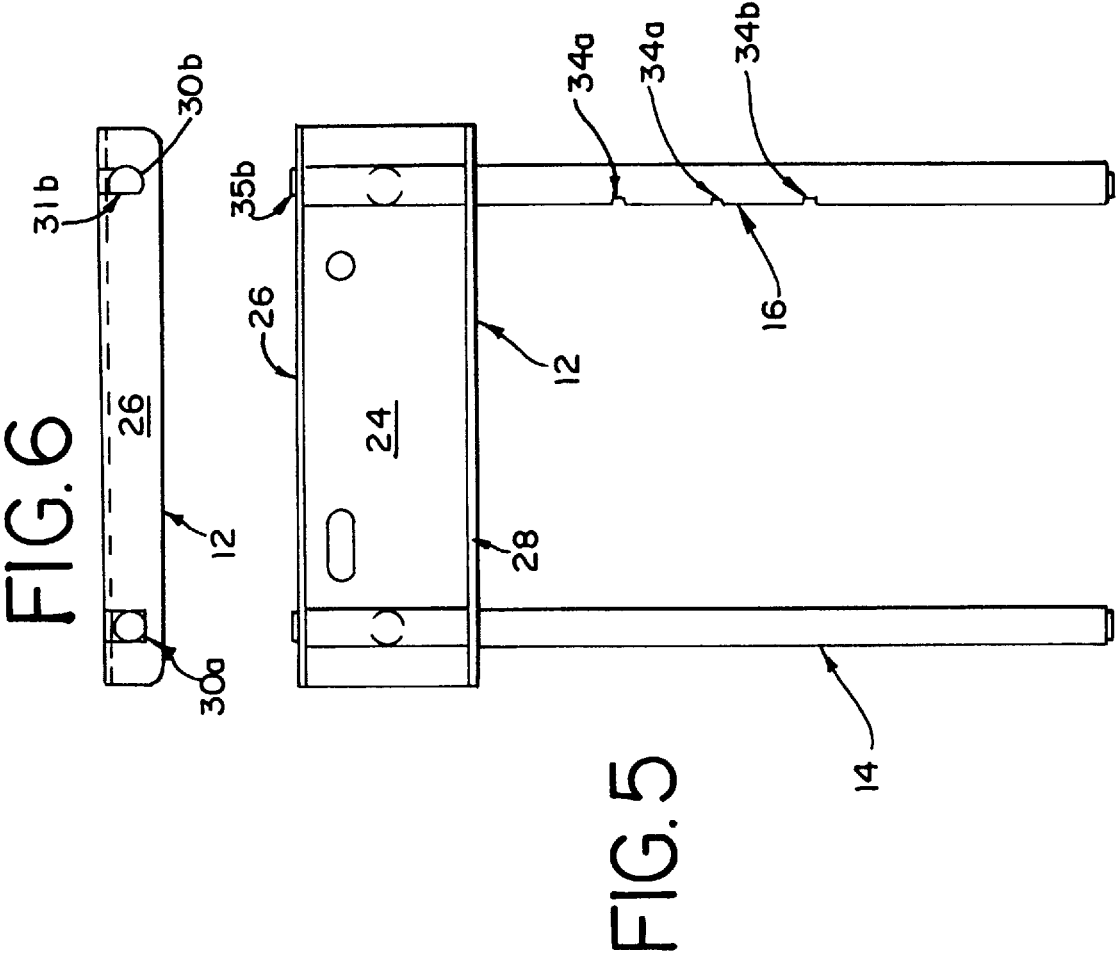
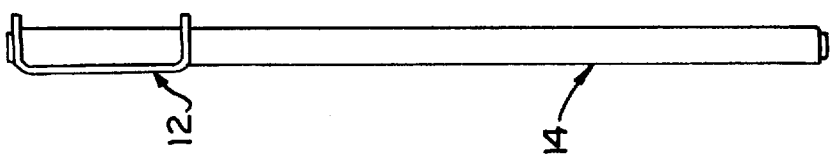

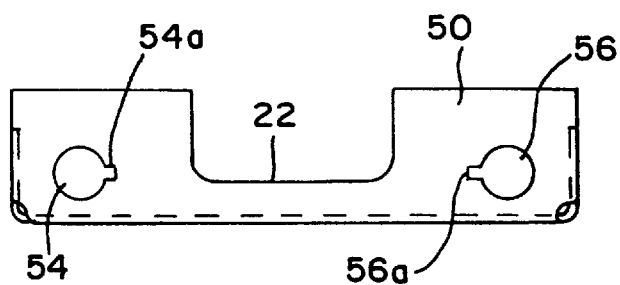
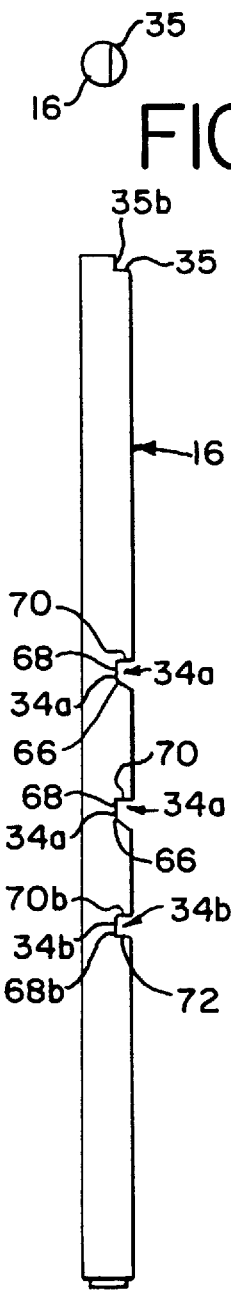
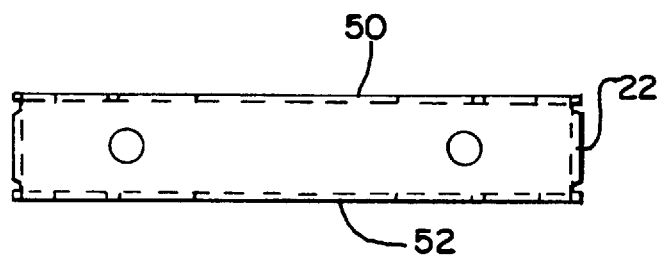
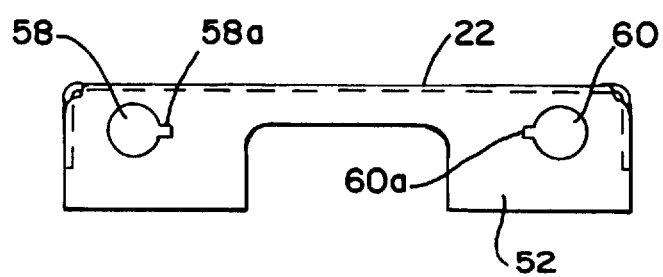

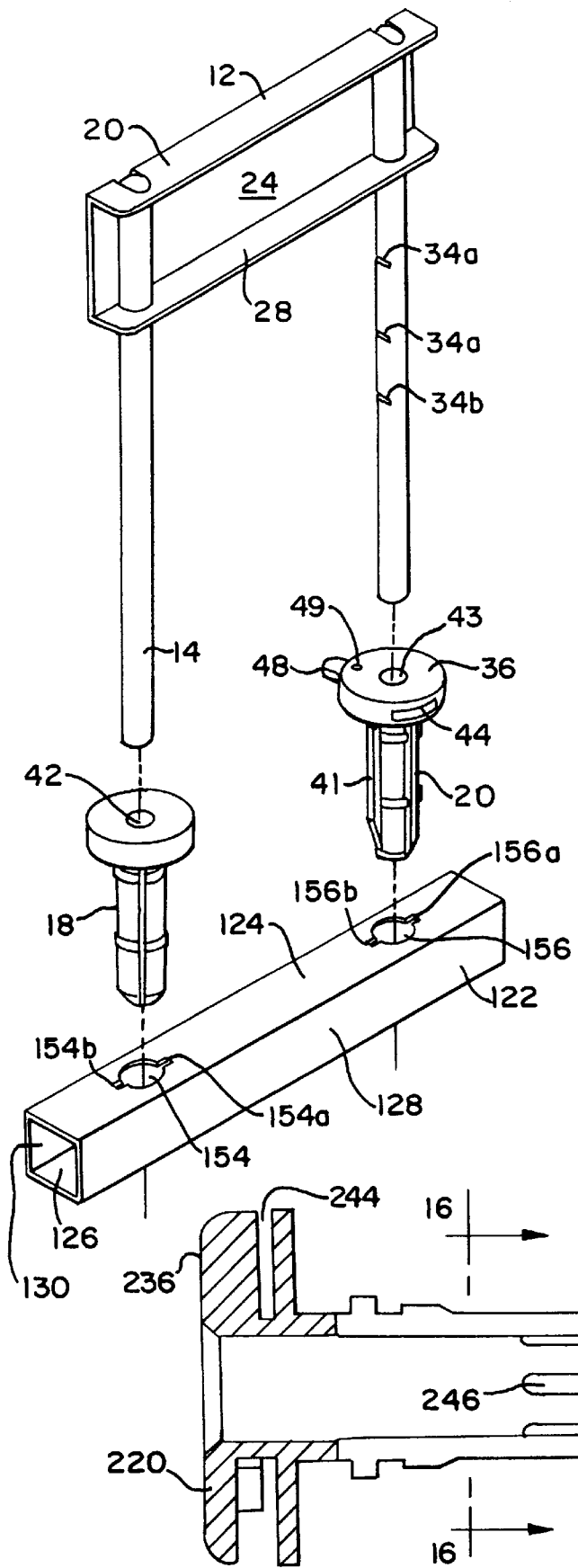
FIG. 14
FIG. 15
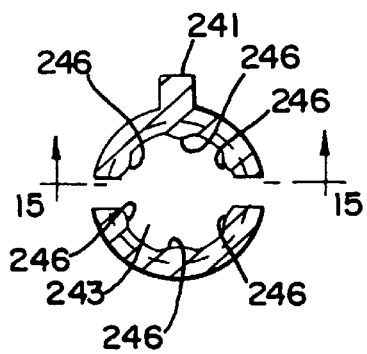
FIG. 16

HEAD REST LOCK

TECHNICAL FIELD

This invention relates to a headrest for a motor vehicle seat and more particularly to an head rest lock for adjusting the elevational position of a headrest of a vehicle seat.

BACKGROUND OF THE INVENTION

There exist a large variety of headrests which are conventionally mounted on one or two support posts that are inserted into guide sleeves, tubes or brackets affixed to the seat back frame structure. Generally, some sort of adjustment mechanism is provided to enable variable vertical positioning of the headrest and to prevent inadvertent removal of the headrest from the seatback.

One such particular type of headrest is one which comprises two support posts which can be easily introduced into sleeves fixed to the framework tube of the backrest and then locked in position by a clip or the like engaged, on one hand, in a slot of the sleeve and, on the other hand, in a recess extending around the perimeter of the corresponding support post. Such an assembly is simple, however, there exist problems of a deformation or breakage of the support posts and unwanted rotation of the sleeves which both limits the ability to have precise locking and places the adjustment latches in a less than optimal positions for manual employment.

SUMMARY OF THE INVENTION

Accordingly, an object of this invention is to provide a device for adjusting the elevational position of a headrest that provides optimum durability and strength.

Another object of the present invention is to provide a device for adjusting the elevational position of a headrest which includes an adjustment latch which is fixed and free from inadvertent rotational movement.

In order to achieve the above and other objects, there is provided according to the present invention a device for adjusting the elevational position of a head rest of a seat for a vehicle which includes a support post having lock notches therein, and sleeves securely mounted around the support posts. The lock notches are located only on one side of the support post for optimum support post strength, and do not extend completely around the perimeter of the support post, thereby weakening support post strength. The sleeves have lock clips mounted therein which are snappingly fitable within the lock notches of the support posts and of which are activated by manually pushing a lock latch that is pivotally mounted in the sleeve. A headrest bracket is fixably attached to the top of the support posts while the bottom of the support posts which are enclosed by the sleeves and are securely anchored in a seatback bracket or seatback frame. The sleeves include rotational lock ribs which fit into rotational lock notches of the seat back bracket or seat back frame, thereby preventing the sleeves and integral lock latches from inadvertent rotational movement. The sleeves also include position ribs which lock the sleeves to the seatback bracket or frame to prevent inadvertent removal of the headrest from the seatback.

The above and other related objects and features of the invention will be apparent from a reading of the following description of the disclosure found in the accompanying drawings and novelty thereof pointed out in the appended claims.

BRIEF DESCRIPTION OF THE DRAWINGS

FIG. 5 is a front plan view of a headrest bracket having both a support post with lock notches and a support post without lock notches attached thereto.

FIG. 6 is a top plan view of the headrest bracket showing two support posts attached thereto.

FIG. 7 is a left side plan view of the headrest bracket showing a support post attached thereto FIG. 8 is a right side plan view of a headrest bracket showing a support post with lock notches therein attached thereto.

FIG. 9 is a front plan view of a seatback bracket.

FIG. 10 is a top plan view of a seatback bracket.

FIG. 11 is a bottom plan view of a seatback bracket.

FIG. 12 is a plan side view of a support post having lock notches therein and showing a top cut-out portion.

FIG. 13 is a plan top view of a support post showing a top cut-out portion.

FIG. 14 is an exploded perspective view of an alternative embodiment of the headrest lock.

FIG. 15 is a side sectional view of an improved internally ribbed sleeve.

FIG. 16 is a top sectional view of an improved internally ribbed sleeve taken at line 16—16 of FIG. 15.

DETAILED DESCRIPTION OF THE INVENTION

Figure 1:
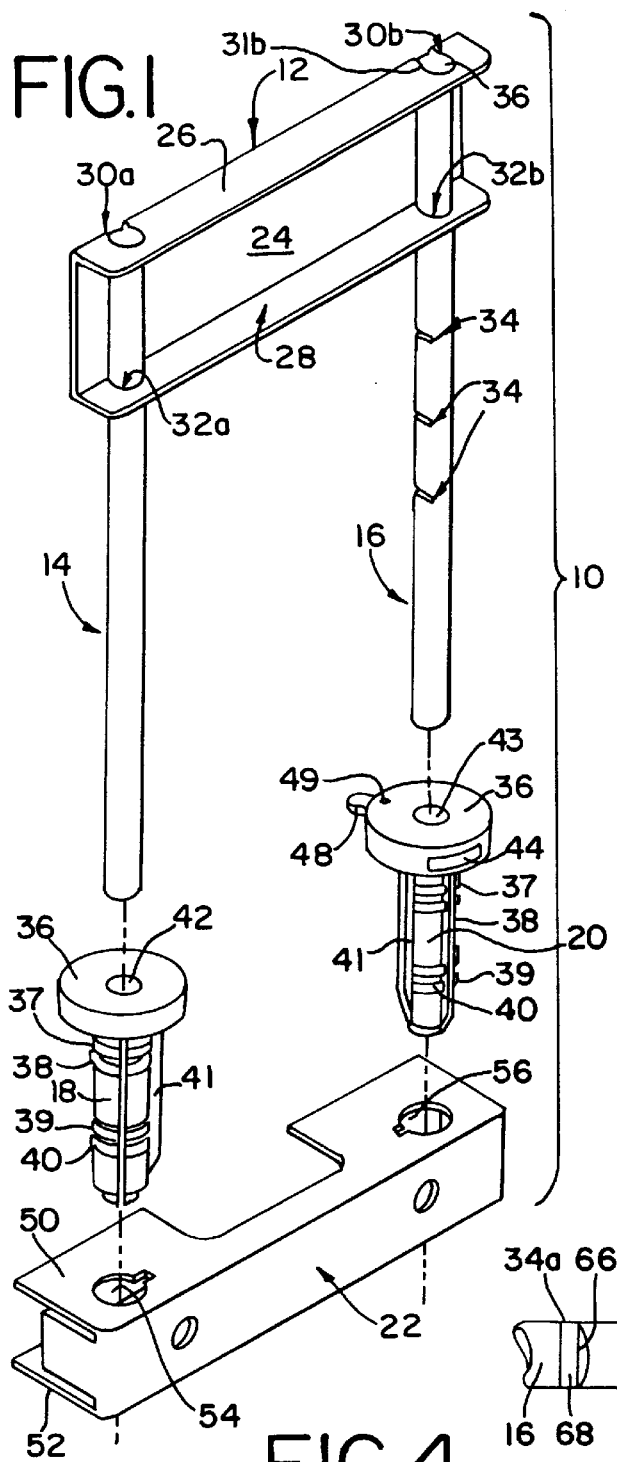
FIG. 1 is an exploded perspective view of the headrest lock.

This invention will now be described in detail with reference to FIG. 1, which shows an or headrest lock 10 which includes a headrest bracket 12, a pair of support posts 14 and 16, a pair of sleeves 18 and 20, and a seatback bracket 22.

As seen in FIGS. 1 and 5–8, headrest bracket 12 includes a central portion 24 and a narrow top and bottom portion 26 and 28 respectively, both portions 26 and 28 being perpendicular to central portion 24. Headrest bracket 12 also has a pair of apertures 30a and 30b in each end of its top portion 26. Aperture 30b has a substantially semi-circular shape with a straight side 31b. A pair of corresponding round apertures 32a and 32b are in each end of the bottom portion 28 of headrest bracket 12.

Support post 14 has a round cross-section and is extends through aperture 32a with its top end terminating in apertures 30a, 30b. In this preferred embodiment, support post 14 is fixedly attached to headrest 12 by a weld. The top of post 14, which fits into aperture 30a, is preferably formed with a reduced diameter portion thereby providing a circumferential ridge on which bracket portion 26 partially rests. This provides for mechanical support, machining to relatively close tolerances and better contact for bonding the post 14 in the aperture 30a, as, for example, by welding.

Support post 16 preferably has a round cross-section and has a plurality of lock notches 34 along one side. As seen in FIGS. 1, 5, 6, 12 and 13, the top of support post 16 has a straight edged cut-out portion 35 leaving a straight edge surface 35b in the support post 16. The straight edge cut-out portion has a corresponding shape to aperture 30b and is fixably positioned in aperture 30b. Straight edge surface 35b fits against straight side 31b of aperture 30b. The remaining round cross-section portion of support post 16 extends through aperture 32b.

Figure 2:
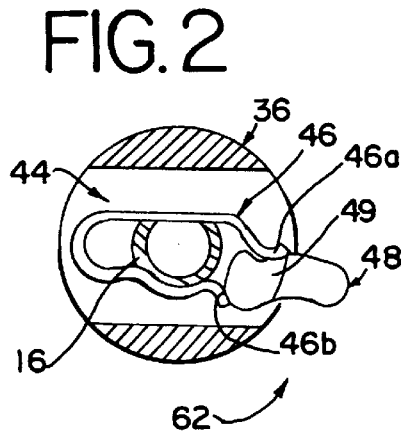
FIG. 2 is a top view of the sleeve and integral head having and showing a lock clip and pivotally attached lock latch.
Figure 3:
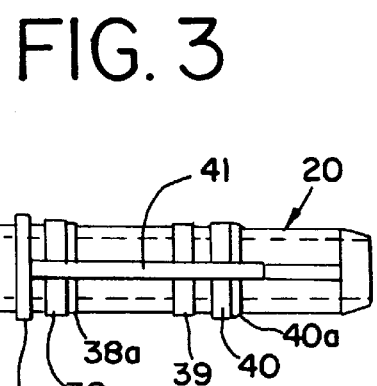
FIG. 3 is a side plan view of the sleeve showing the integral placement ribs, rotational lock rib and lock latch.
Figure 4:
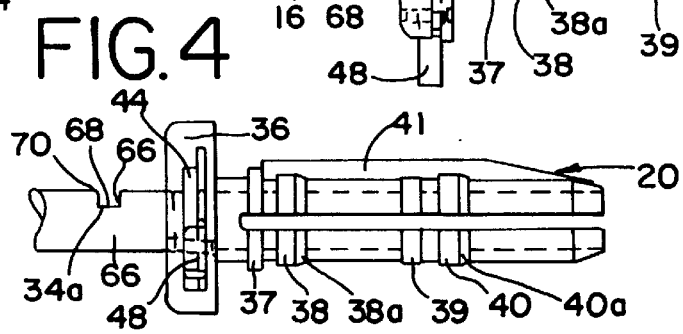
FIG. 4 is a front plan view of the sleeve showing the integral placement ribs, rotational lock rib, slot and lock latch within the slot.

Sleeves 18 and 20 include an integral head portion 36, position ribs 37, 38, 39 and 40, rotational lock rib 41, and bores 42 and 43 respectively. As seen in FIGS. 2–4, sleeve's 20 head portion 36 additionally has a slot 44 therethrough. Lock clip 46 is attached around the wall of bore 43, a portion, described below, engageable with support post 16 through slot 44. A lock latch 48 is pivotally mounted by pivot pin 49 to head portion 36 in slot 44. One end of lock latch 48 is positioned between clip ends 46a and 46b. The other end of lock latch 48 extends outside slot 44. Support post 14 slidably fits inside bore 42. Support post 16 slidably fits inside bore 43. Sleeves can be formed from a number of plastic materials which provide both adequate structural strength, economical forming, resiliency when subjected to loads in operation and preferably some level of self lubricating properties to permit easy sliding of posts 14, 16 inside bores 42, 43.

As seen in FIGS. 1, and 9–11, seat back bracket 22 includes a U-shaped top ledge 50 and a U-shaped bottom ledge 52. Top ledge 50 has a pair of apertures 54 and 56 therethrough at each of its ends. Similarly, bottom ledge 52 has a pair of corresponding apertures 58 and 60 therethrough at each of its ends. Apertures 54, 56, 58 and 60 include rotational lock slots 54a, 56a, 58a and 60a therein.

Sleeves 18 and 20 snappingly fit into seat back bracket 22. As seen in FIGS. 1, 3 and 4, sleeves 18 and 20 include position ribs 37, 38, 39 and 40. Position ribs 38 and 40 include incline portions 38a and 40a respectively. The diameter of position ribs 37, 38, 39 and 40 are slightly larger than the diameter of apertures 54, 56, 58 and 60. This difference in diameter size and the tapered shape allows sleeve 18 to be inserted through apertures 54 and 58 and sleeve 20 to be inserted through apertures 56 and 60 whereby top ledge 50 snap fits between position ribs 37 and 38 of each sleeve 18 and 20. Similarly, when sleeves 18 and 20 are inserted into apertures 54 and 58, bottom ledge 52 snap fits between position ribs 39 and 40. Rotational lock ribs 41 of each sleeve 18 and 20 extend through rotational lock slots 54a, 56a, 58a and 60a when sleeves 18 and 20 are inserted through apertures 54, 58, 56 and 60 of seat back bracket 22. The positioning of rotational lock ribs 41 in slots 54a, 56a, 58a and 60a prevents any rotational movement of sleeves 18 and 19 in apertures 54, 58, 56 and 60.

The purpose of headrests in vehicles is primarily to support the head of a front-facing occupant in a rear-end collision. Rear facing seats having headrests, of course, support in the opposite direction. The load thus imposed by the acceleration or deceleration is typically on an axis perpendicular to brackets 12 and 22 which corresponds to the direction the seat is facing. This can be referred to as a seat axis. Rotational locking of sleeve 20 permits maximizing strength against these loads because post 16 need not be grooved around its entire circumference as discussed below.

When completely assembled, the top of support posts 14 and 16 are welded to headrest bracket 24 as the top of the support posts are positioned in apertures 30a, 32a, 30b and 32b. The bottom of support posts 14 and 16 fit into bores 42 and 43 of sleeves 18 and 20. Sleeves 18 and 20 are snap fitted into seat back bracket 22 through apertures 54, 58, 56 and 60.

In operation, the elevational or vertical position of the headrest is adjusted by moving a headrest which is attached to headrest bracket 24 to line up with the lock notches generally designated 34, but having two different configurations 34a and 34b, so that lock clip 46 engages the respective notch 34a or 34b.

Starting with the clip 46 in the upper of the notches 34a with a beveled configuration, the headrest bracket 24 can be raised, displacing the spring member in clip 46 so that it slides until clip 46 aligns the next lower notch 34a. At this point, lock clip 46 engages the newly adjacent lock notch 34a to lock the headrest in a position where it is prevented from moving vertically downwardly. In the upper position with notch 34a engaged, the headrest is prevented from moving vertically downwardly, as described herein in more detail. Bracket 24 can be raised once more until clip 46 engages notch 34b. However since notch 34b is square in section, clip 46 engaging therein limits movement either in an up or down direction.

To unlock the or headrest lock 10, the operator pushes the portion of the lock latch 48 extending outside sleeve's 20 head portion 36 and slot 44 in the direction of arrow 62 about pivot pin 49 (As seen in FIG. 2). This causes the portion of locking latch 48 extending inside slot 44 to push against end 46a of the lock clip 46, thereby, forcing the lock clip out of lock notch 34a or 34b. The headrest is now unlocked and may be adjusted either up or down. Once the headrest is moved vertically to where the lock clip 46 is no longer adjacent to the lock notch 34a or 34b, the lock latch may be released and the headrest may be moved up or down until another lock notch 34a or 34b along support post 16 comes to a position adjacent lock clip 46, whereby, the lock clip 46 will once again snap into the adjacent lock notch 34 to lock the headrest in another selected vertical position. Thus, it is necessary to actuate latch 48 to either move the headrest up or down from alignment of clip 46 with notch 34b or to move the headrest down if clip 46 is aligned with notch 34a. From notch 34a, the headrest may be raised without actuating latch 48.

The ability to fix sleeve 20 against rotation in bracket 22 enables the forming of lock notches 34a and 34b to a more advantageous geometry than the prior art. The prior art, having a rotatable sleeve used a shallow groove completely around the circumference of the post. Because this circumferential groove substantially weakened the post, this prior art groove was of small section. By both limiting the location of notches 34 to a single side of post 16 and by aligning notches 34 away from the front and rear portions of post 16 where loads would be concentrated, the strength of support post 16 is maximized.

If locking latch 48 is released against the spring pressure of clip 46 when post is vertically aligned such that clip 46 abuts the exterior surface of post 16 the headrest can be slid until clip 46 comes into engagement with notch 34a or 34b. FIG. 12 shows the preferred arrangement with notches having profiles 34a for the upper notches and a square profile 34b for the bottom notch. The angled or beveled notch 34a permit the headrest bracket 12 to be slid upwardly without releasing latch 48 but not to slide downwardly unless latch 48 disengages clip 46. Bottom notch 34b does not permit either upward or downward movement without release of latch 46.

Notch 34a preferably has a ramp 66 which leads clip 46 to contact face 68 for a positive lock. Wall 70 supports post 16 vertically. The face 68, wall 70, and ramp 68 define a notch axis. As vertical adjustment of headrest height to a seat occupant is advantageous this configuration which enables more sure locking, particularly where unlocked, released and downwardly slid, the invention is an important advance.

Notch 34b has wall 70b and face 68b. Instead of having ramp 66, square notch 341b has wall 72 which is parallel to wall 70b, thereby forming a square notch 34b.

FIG. 14 shows an alternative embodiment. This embodiment is adapted to use a square section tube seatback bracket 122. This may, for example be a square section tube forming the frame of a seat, such as a bucket seat or bench seat for a vehicle, in accordance with known methods of vehicle seat construction. The tube 122 has top wall 124 and bottom wall 126, interconnected by side walls 128, 130. The arrangement of apertures to receive sleeves 18, 20 uses paired apertures of the same configuration, however the bottom apertures are not visible in FIG. 14. Apertures 154 and 156 receive sleeves 18, 20. However, unlike the bracket 22, each aperture 154 and 156 has two rotational lock slots 154a and 154b and rotational lock slots 156a and 156b, respectively. In use in an application such as a bench seat which is designed to have a plurality of seating positions, apertures 154 and 156 can be preformed in a continuous series of apertures, each of identical form. In this manner, production of seat frames is more efficient, and the seat upholstery designer can fit either sleeve 18 or sleeve 20 in the appropriate aperture. Because of the plurality of opposed lock slots 154a, 154b, 156a and 156b, respective ribs 41, lined up as needed to align clip 46 with the appropriate notches 34a and 34b. In this manner, greater manufacturing flexibility is provided, while preserving the essential advantages of lining up notches 34a and 34b and clips 46 over the prior art annular grooves.

FIG. 15 shows an improved internally ribbed sleeve 220 include an integral head portion 236 with rotational lock rib 241, and bore 243. This head portion 236 also has a slot 244 therethrough. As in the other embodiments, lock clip 46 is used to engage with support post 16. A lock latch 48 is pivotally mounted by pivot pin 49 to head portion 236 in slot 44 in the same manner as described with respect to sleeve 20.

In sleeve 220, support post 16 slidably fits inside bore 243. The improvement in sleeve 220 is the use of bearing ribs 246 which directly bear on post 16. These provide considerable advantages in manufacturing and operation. As described above, sleeves 20 can be formed of a plastic material having a level of resiliency and self lubrication. Using a material having these properties has advantages in this alternative embodiment. Ribs 246 permit forming sleeve 220 with a bore 243 having greater clearance with the diameter of post 16 because ribs 246 will actually bear and center post 16. Resiliency provided by the material also permits a controlled level of distortion of ribs 246 if necessary, while the semicircular section of ribs 246 also provides for a needle bearing like effect, with contact only along the line on the rib 246 which contacts the corresponding line on the surface of post 16. This makes forming sleeve move economical and of improved quality because tolerances need not be as close as that for sleeve 20. These advantages also apply to a similarly configured sleeve corresponding to the non-locking sleeve 18.

The preceding objects, drawings and description are illustrative of the embodiments of the invention, however, it must be understood that these particular arrangements merely illustrate and that the invention is to be given its fullest interpretation within the terms of the appended claims.

What is claimed is:

1. A head rest lock comprising:

at least one support post, said support post having at least one lock notch therein, said lock notch being positioned only on one side of said support post;

a sleeve slidably supporting said support post, said sleeve including means for lockingly attaching to said support post;

a seat back bracket, said sleeve being attached to said seat back bracket; and a headrest bracket, said headrest bracket being attached to said support post;

said means for lockingly attaching said sleeve to said support post includes a resilient lock clip mounted within said sleeve and against said support post, said lock clip being snappingly fitable within said lock notch whenever said sleeve is positioned along said support post placing said lock clip adjacent to said lock notch, and wherein said sleeve includes a head portion having a slot therein, said resilient lock clip being mounted within said slot, said head including a lock latch being pivotally mounted within said slot and adjacent said lock clip, whereby, whenever said lock clip is within said lock notch, rotation of said lock latch causes said lock latch to push against said lock clip, which in turn, forces said lock clip to move out of said lock notch, thereby, allowing said sleeve to freely slide along said support post.

2. A head rest lock as in claim 1 wherein said sleeve includes means to prevent said sleeve from rotating around said support post;

said means to prevent said sleeve from rotating includes said sleeve having a rotational lock rib and said seat back bracket having an aperture with a rotational lock notch therein, said rotational lock rib being positioned in said rotational lock notch, thereby, preventing rotation of said sleeve within said aperture.

3. A head rest lock comprising:

at least one support post, said support post having at least one lock notch therein;

a sleeve slidably supporting said support post, said sleeve including a latch which locks and releases said support post for vertical movement;

a seat back frame, said sleeve being attached to said seat back frame;

a headrest bracket, said headrest bracket being attached to said support post;

said latch includes a resilient lock clip mounted within said sleeve and against said support post, said lock clip being snappingly fitable within said lock notch whenever said sleeve is positioned along said support post placing said lock clip adjacent to said lock notch, wherein, said sleeve includes a head portion having a slot therein, said resilient lock clip being mounted within said slot, said head including a lock latch being pivotally mounted within said slot and adjacent said lock clip, whereby, whenever said lock clip is within said lock notch, rotation of said lock latch causes said lock latch to push against said lock clip, which in turn, forces said lock clip to move out of said lock notch, thereby, allowing said sleeve to freely slide along said support post.

4. A head rest lock comprising:

at least one support post, said support post having at least one lock notch therein;

a sleeve slidably supporting said support post, said sleeve including a latch which locks and releases said support post for vertical movement;

a seat back frame, said sleeve being attached to said seat back frame;

a headrest bracket, said headrest bracket being attached to said support post said latch includes a resilient lock clip mounted within said sleeve and against said support post, said lock clip being snappingly fitable within said lock notch whenever said sleeve is positioned along said support post placing said lock clip adjacent to said lock notch, said sleeve includes a rotational lock rib which prevents said sleeve from rotating around said support post, said rib engages a seat back bracket having an aperture with a rotational lock notch therein, said rib being positioned in said notch, thereby preventing rotation of said sleeve within said aperture.

5. A head rest lock for a vehicle seat back comprising:

a sleeve adapted to be mounted to said seat back, said sleeve being of substantially cylindrical form and having an aperture of substantially cylindrical form;

a post of substantially cylindrical form having an exterior surface, a first end slidably receivable in said aperture and a second end opposite said first end;

a headrest for resisting loads imposed by vehicle acceleration or deceleration along a seat axis on a seat occupant's head, said headrest being mounted to said second end;

latch releasably fixing said post in a selected vertical position;

said latch fixing said post in a selected vertical position by engaging a notch formed in said post, said notch having a notch axis, said notch axis being oriented parallel to said seat axis, said latch including a lock clip;

said lock clip having a first end and a second end;

said first end engaging said notch so as to fix said post in a selected vertical position and being disengageable so as to permit said post to be selectively raised or lowered; and said notch having a face against which said latch bears in a locked position, a wall against which said latch bears to vertically support said headrest and a ramp which permits movement in a selected vertical direction.

6. A head rest lock for a vehicle seat back comprising:

a sleeve adopted to be mounted to said seat back, said sleeve being of substantially cylindrical form and having an aperture of substantially cylindrical form;

a post of substantially cylindrical form having an exterior surface, a first end slidably receivable in said aperture and a second end opposite said first end;

a headrest for resisting loads imposed by vehicle acceleration or deceleration along a seat axis on a seat occupant's head, said headrest being mounted to said second end;

a latch releasably fixing said post in a selected vertical position;

said latch fixing said post in a selected vertical position by engaging a notch formed in said post, said notch having a notch axis, said notch axis being oriented parallel to said seat axis, said latch including a lock clip;

said lock clip having a first end and a second end;

said first end engaging said notch so as to fix said post in a selected vertical position and being disengageable so as to permit said post to be selectively raised or lowered said second end being formed and arranged so that it may be fixed in said sleeve and operation of said latch biases said first end away from said second end such that said first end extends out of said notch and said cylindrical portion can pass said first end thereby permitting said post to be selectively raised or lowered;

said post being a first post;

said headrest being supported by said first post and a second post, whereby said headrest is restricted from rotational movement relative to said seat back.

7. The invention according to claim 6 and:

said notch being oriented to permit the vertically upward movement of said headrest without releasing said latch and to resist the vertically downward movement of said headrest unless said latch is released.

8. The invention according to claim 6 and:

said notch being a first notch;

said post having a second notch being a square sectional notch configured so as to resist upward and downward movement unless said latch is released.

* * * * *